No. 855,645. PATENTED JUNE 4, 1907.
H. H. KRYGER.
CUTTING MECHANISM FOR HARVESTERS AND SIMILAR MACHINES.
APPLICATION FILED MAR. 31, 1906.
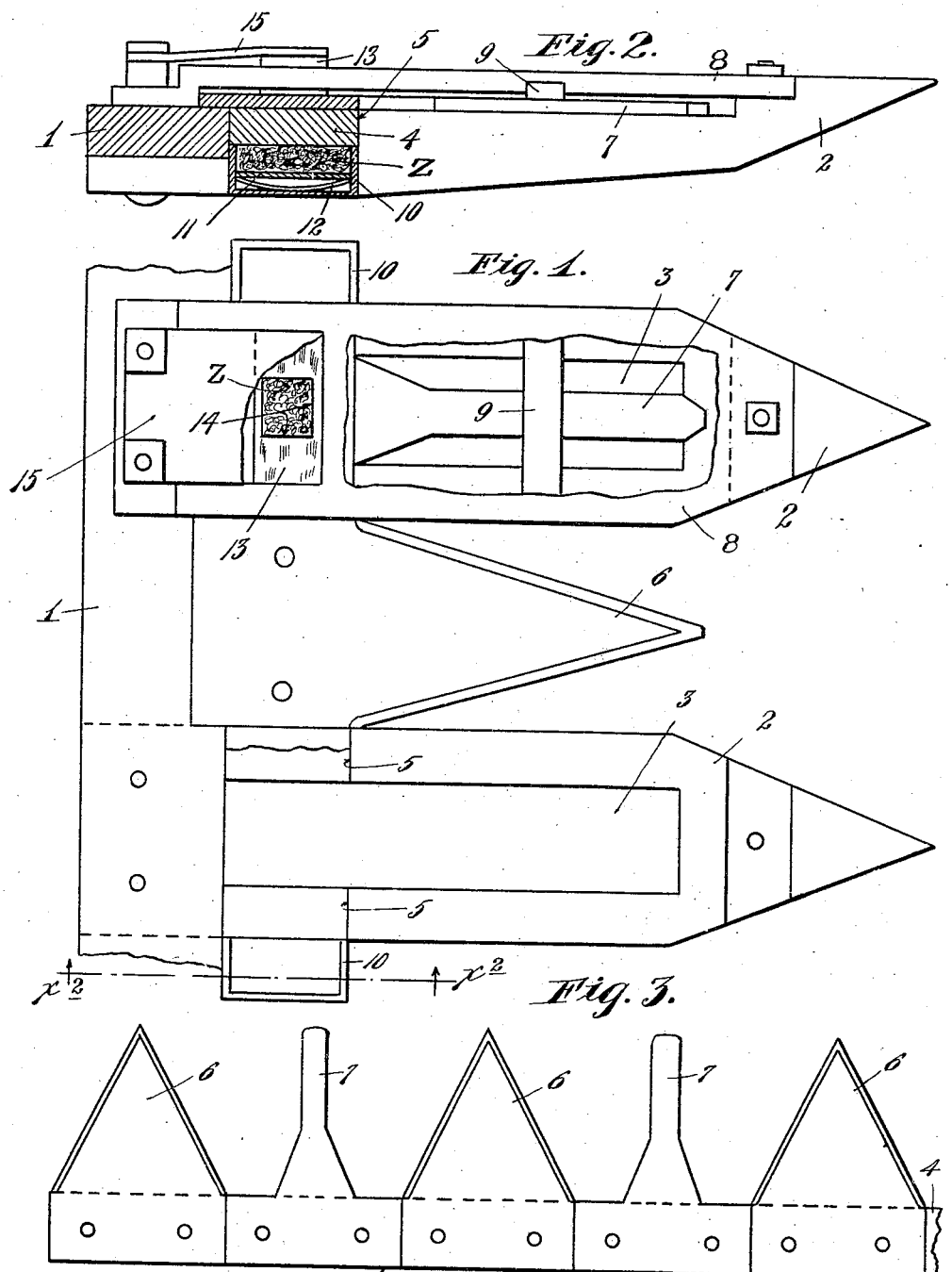

UNITED STATES PATENT OFFICE.

HENRY H. KRYGER, OF MINNEAPOLIS, MINNESOTA.

CUTTING MECHANISM FOR HARVESTERS AND SIMILAR MACHINES.

No. 855,645.  Specification of Letters Patent.  Patented June 4, 1907.

Application filed March 31, 1906. Serial No. 309,066.

*To all whom it may concern:*

Be it known that I, HENRY H. KRYGER, a citizen of the United States, residing at Minneapolis, in the county of Hennepin and State of Minnesota, have invented certain new and useful Improvements in Cutting Mechanism for Harvesters and Similar Machines; and I do hereby declare the following to be a full, clear, and exact description of the invention, such as will enable others skilled in the art to which it appertains to make and use the same.

My invention has for its object to provide an improved cutting mechanism for harvesters and similar machines, and to this end it consists of the novel devices and combinations of devices hereinafter described and defined in the claims.

In the accompanying drawings which illustrate the invention like characters indicate like parts throughout the several views.

Referring to the drawings, Figure 1 is a plan view with some parts broken away showing a portion of a finger-equipped bar and co-operating sickle, and illustrating my invention incorporated therein. Fig. 2 is a transverse vertical section taken on the line $x^2$ $x^2$ of Fig. 1, and Fig. 3 is a plan view of the sickle.

1 indicates a finger bar of a harvester mower or similar machine; 2 indicates sickle bar fingers bolted or riveted thereto, and which fingers involve novel features of construction. These fingers 2 are much wider than the fingers usually employed. Their forward ends are tapered at an angle of about thirty degrees, and the body portions thereof have approximately parallel sides, and are formed with long slots or openings 3, for a purpose which will presently appear.

The sickle bar 4 works in a suitable seat formed between the finger bar 1 and shoulders 5 of the said fingers 2. The sickle blades 6 are riveted to the sickle bar 4 in the usual way, but between adjacent sickle blades are interposed forwardly projecting clearing teeth 7, the base portions of which are preferably flared rearwardly. The edges of the sickle blades are of course beveled and brought to a sharp edge. The clearing teeth 7 are formed with blunt or vertical edges. The sickle blades and the clearing teeth 7 lie in the same horizontal plane, and they move in close engagement with the upper surfaces of the fingers 2. Retaining plates 8, which are secured at their rear ends to the finger bar 1 and at their forward ends to the fingers 2, overlie the clearing teeth 7 and hold the same in close engagement with the upper surfaces of the respective fingers 2. As preferred and shown in the drawings, wearing strips 9, which are directly secured to the retaining plates 8, extend transversely of the teeth 7 and directly engage the upper surfaces thereof.

In connection with each finger 2 is a lubricating box 10, which is secured thereto in any suitable way, with its open top presented directly against the under surface of the sickle bar 4. In the bottom of each lubricating box 10 is a follower plate 11 that is yieldingly pressed upward by a spring 12. Graphite indicated by the character $z$ being placed in the box 10 and upon the follower 11 will be pressed upward against the under surface of the sickle bar 4, and thus keep the same lubricated.

Each retaining plate 8, directly overlying the sickle bar 4, is provided with a seat which loosely holds a rectangular lubricating box 13, that is provided with a perforation 14 adapted to receive and hold graphite, or other hard lubricating material. This lubricating box 13 is yieldingly pressed downward on to the base portions of the underlying teeth 7, by a flat spring 15 which is secured at its rear end to the rear portion of said retaining plate 8. Under the action of the springs 15 the lubricating boxes 13 are yieldingly pressed against the base portions of the teeth 7, and are thus caused to keep the sickle bar 4 pressed downward against its seats in the rear portions of the fingers 2. In this way the sickle is lubricated both at the top and bottom.

The sickle should be given such reciprocating movement that the points of the sickles will be caused to travel from the near edge of one adjacent finger to the near edge of the other adjacent finger; that is, the sickle should be given a movement, first in the one direction and then in the other, which is equal to or a little greater than the distance between the opposing edges of adjacent fingers. The relative transverse dimensions of the fingers 2, of the slots 3 therein, and of the clearing teeth 7, should be such that under the above noted movement of the sickle, the said clearing fingers will be caused to travel across the respective slots 3, and from one edge or side to the other of the respective fingers. In virtue of this construction the clearing teeth, so-called, will act to keep all wet grain, grass, or other material, worked out from between the upper surfaces of the fingers 2 and the under surfaces of the retaining plates 8. Some of such material, when caught in said clearing teeth, will be discharged at the outer edges or sides of the fingers, and some will be worked out or discharged through the slots 3 thereof. A cutting mechanism of this character is adapted for use to cut wet or damp grain or grass, and in this respect is thought to be a decided improvement over cutting mechanisms hitherto employed; that is, cutting mechanisms in which only the usual sickle blades are employed.

The sickles above described require but a very short movement, and hence is especially well adapted to be driven by the mechanism disclosed and claimed in my companion application of even date herewith, and entitled "Sickle drive for harvesters."

In Fig. 3 the sickle blades and the clearing teeth are shown as relatively short, as compared with those shown in Figs. 1 and 2, but otherwise the construction is the same.

I claim as my invention:

1. The combination with a finger-equipped bar, of a co-operating sickle having sickle blades and interposed clearing teeth both co-operating with said fingers, substantially as described.

2. The combination with a finger bar and a plurality of fingers secured thereto and having overlying retaining plates, of a sickle bar having sickle blades and clearing teeth working in the space between the upper surfaces of said fingers and the under surfaces of said retaining plates, substantially as described.

3. The combination with a finger bar and a plurality of fingers secured thereto, said fingers having longitudinal slots and overlying retaining plates, of a sickle bar having alternately arranged sickle blades and clearing teeth working in the space between the upper surfaces of said fingers and the under surfaces of said retaining plates, substantially as described.

4. The combination with a finger bar and a plurality of fingers secured thereto, of a sickle co-operating therewith, retaining plates secured to each finger and overlying said sickle, lubricating boxes loosely seated in said retaining plates and resting upon the upper surface of said sickle, and springs yieldingly pressing said lubricating box against the sickle, substantially as described.

5. The combination with a finger bar having a plurality of fingers formed with long open slots, said fingers having overlying retaining plates secured thereto at the front and rear portions thereof, of a sickle bar having sickle blades and clearing teeth working in the space between the upper surfaces of said fingers and the under surfaces of said retaining plates, substantially as described.

6. A sickle having sickle blades and interposed clearing teeth, substantially as described.

7. The combination with a finger-equipped bar and a sickle coöperating therewith, of lubricating boxes engaging the upper portion of said sickle, and means yieldingly pressing said lubricating boxes downward onto the said sickle, whereby said sickle will be lubricated and said yieldingly pressed boxes will assist in holding the same seated on said fingers, substantially as described.

In testimony whereof I affix my signature in presence of two witnesses.

HENRY H. KRYGER.

Witnesses:
 MALIE HOEL,
 F. D. MERCHANT.